This invention relates to a new group of azo dyes having a unique, highly desirable combination of properties and which have the following structure:

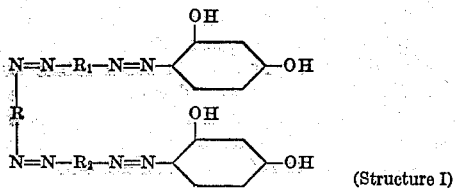

(Structure I)

wherein R represents diphenylamine-2-sulfonic acid in which the azo linkages are para to the secondary amino group; $R_1$ represents either of the following groups:

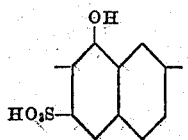

and

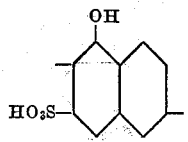

and $R_2$ represents either of the following groups:

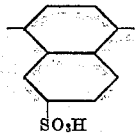

and

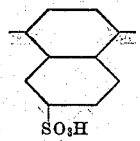

The new dyes are obtained by successively coupling, in any desired sequence, two different compounds, namely an amino naphthol sulfonic acid and a 1-naphthylamine sulfonic acid, to a tetrazotized diamino-diphenyl amine sulfonic acid, tetrazotizing the resulting compound and thereafter coupling it to two moles of resorcinol.

The structure of the dye will vary somewhat with the sequence in which the coupling operations are carried out in that the coupling reagent used in the first coupling will be coupled to the stronger tetrazonium group of the tetrazotized diamino-diphenyl amine sulfonic acid. Thus, for example, where 2-amino-8-naphthol sulfonic acid and 1-naphthylamine-6-sulfonic acid are employed as the coupling agents to provide the $R_1$ and $R_2$ substituents, the resulting dye can have either of the following structures depending on which reagent is coupled first:

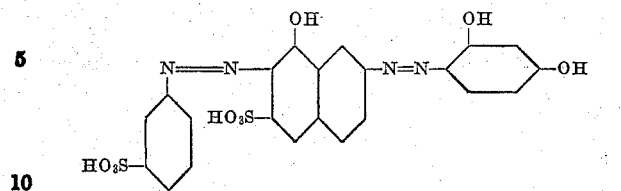

(Structure IIa)

or

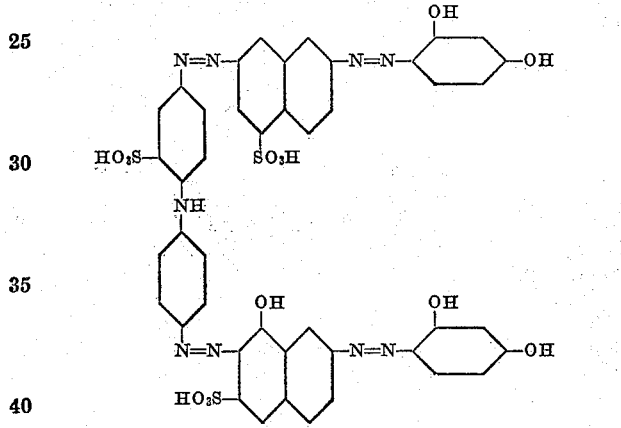

(Structure IIb)

However, regardless of the coupling sequence employed to produce the dye, dyeing characteristics of Structures IIa and IIb dyes are substantially the same.

The dyes prepared in this way are direct dyes for cellulosic fibers such as cotton and rayon. They dye such fibers in pure jet black shades, and when after-treated with formaldehyde, the dyeings exhibit excellent washfastness even when metallic fastening adjuncts are not employed in the formaldehyde treatment.

Cellulose acetate and polyamide (nylon) fibers are not stained to any significant degree by the dyes contemplated by this invention under dyeing procedures usually employed commercially in the direct dyeing of cellulosics. Therefore, they can be utilized for producing distinctive effects on fabrics prepared from cellulosics mixed with acetate or with nylon or combinations thereof. Heretofore, this unique combination of properties, i.e. washfastness when after-treated with formaldehyde alone together with non-staining of hydrophobics such as acetate and nylon could not be obtained with dyes providing jet black shades.

The dyes of my invention may also be used in combination with other dyes in order to produce shade variations, and because they do not appreciably stain hydrophobics they are also useful as shade modifying additives in dye mixes intended to be used in the dyeing of fabrics composed of cellulosic fibers in admixture with hydrophobic fibers.

Previous attempts have been made to obtain dyes with these properties by coupling 2 moles of an amino naphthol sulfonic acid such as 2-amino-8-naphthol-6-sulfonic acid with 1 mole of tetrazotized 4,4'-diamino-diphenylamine-2-sulfonic acid, tetrazotizing the resulting compound and thereafter coupling the second tetrazo compound with 2 moles of resorcinol. Such dyes although having the desired properties of leaving acetate and nylon white and having excellent washfast properties when after-treated with formaldehyde were of an undesirable greenish shade from which pure jet blacks could not be made.

Earlier dyes made by using 1,3-diamino benzene in place of resorcinol in the above compound were blacks of a less green shade but they stained cellulose acetate and nylon. Attempts to overcome these difficulties by substituting hydroxyethyl and carboxymethyl groups on the amines of the 1,3-diamino benzene resulted in dyes of greatly reduced washfastness even when subjected to after-treatment with formaldehyde.

The dyes of my invention overcome these objections and are characterized by their pure jet black shades when dyed on cellulose fibers, and exhibit excellent washfastness when after-treated on the fiber with formaldehyde. Also when dyed in combination with cellulose acetate or nylon they leave these fibers virtually unstained, a highly desirable property.

The following examples will serve to illustrate how the dyes of my invention can be prepared and used. In these examples, unless otherwise indicated, parts are by weight, temperatures are given in degrees centigrade and percentages are percentages by weight.

Example I 27.9 parts of 4,4'-diaminodiphenylamine-2-sulfonic acid were slurried with 200 parts of water. 44 parts of 30% hydrochloric acid were added and stirred for ½ hour. The mixture was iced to 0–5° C. and tetrazotized by adding 14 parts of sodium nitrite as a 30% solution and maintaining a slight excess of nitrite for 30 minutes at a temperature of 0–5°. To the slurry formed of 24.0 parts of 2-amino-8-naphthol-6-sulfonic acid in 300 parts of water, 20 g. of sodium carbonate was added, and stirred until dissolved and then iced to 10°.

A concentrated sodium carbonate solution was added to the iced tetrazo until it was rendered definitely alkaline (pH above 8.0). The amino naphthol sulfonic solution was slowly run into the alkaline tetrazo solution and stirred at 0–5° until coupled.

23.0 parts of 1-naphthylamine-6-sulfonic acid was slurried in 200 parts of water. 6 parts of sodium carbonate were added and stirred until dissolved. This solution was immediately added to the diazo-azo coupling prepared above and stirred for 2 hours. The mixture was salted 10–12% with sodium chloride and filtered.

The filter cake was stirred in 500 parts of a 5% sodium chloride solution until a smooth slurry was obtained. The mixture was iced to 5°, 50 parts of 30% hydrochloric acid solution was added and tetrazotized with 14 parts of a 30% sodium nitrite solution at 5–10° C. for 2 hours. Thereafter 25 parts of 1,3-dihydroxy benzene were dissolved in 200 parts of water. After icing to 5°, 40 parts of sodium carbonate were added with stirring until dissolved. The tetrazo was slowly added to the alkaline 1,3-dihydroxy benzene solution. The coupling mixture was maintained at 0–5° and definitely alkaline to Brilliant Yellow. Stirring was continued for 1 hour after the addition. The mix was heated to 70–75°, salted with 5% sodium chloride, filtered, dried at 70–75°. The dried powder was black in appearance and is a Structure I compound in which $R_1$ is

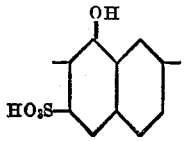

and $R_2$ is

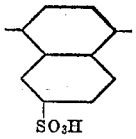

Dyeings were prepared by dissolving 0.2 gram of the product in 100 ml. water at 190–200° F. diluting the bath to 200 ml. with water. A 10 g. piece of 50–50 rayon and acetate was wet out and entered in the dye bath. The temperature was raised to 180–190° F. and dyeing continued for ½ hour. 3 grams of calcined Glauber's salt as a 20% solution were then added and dyeing continued for ½ hour longer at 180–190° F. with frequent agitation. The thus treated fabric was removed from the bath and rinsed in cold water. The rayon was dyed a deep bloomy black and the acetate was unstained.

The rinsed dyed fabric was entered in bath containing 1 ml. of 37% formaldehyde in 200 ml. of cold water. The temperature was increased to 150–160° F. and held for 20 minutes. The thus treated fabric was removed, rinsed in cold water and dried. A deep jet black was obtained on the rayon and the acetate fibers were virtually unstained. The dyeing exhibited excellent washfastness when subjected to AATCC wash test #3.

Example II

Structure I compounds in which $R_1$ is

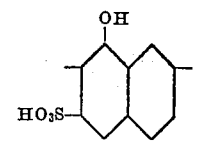

and $R_2$ is

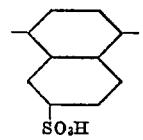

are prepared by proceeding as in Example I but substituting 2-amino-5-naphthol-7-sulfonic acid for the 2-amino-8-naphthol-7-sulfonic acid. The dye prepared in this way has the same properties and dyeing characteristics as the dye of Example I but it is of slightly redder shade.

Example III

Structure I compounds in which $R_1$ is

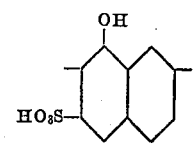

and $R_2$ is

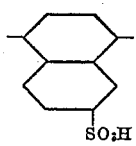

are prepared by proceeding as in Example I but substituting 1-naphthylamine-7-sulfonic acid for 1-naphthylamine-6-sulfonic acid. The dye prepared in this way has the same properties and dyeing characteristics as the dye of Example I.

Example IV

Structure I compounds in which $R_1$ is

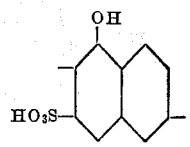

and $R_2$ is

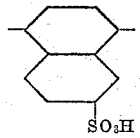

are prepared by proceeding as in Example I but substituting 2-amino-5-naphthol-7-sulfonic acid for the 2-amino-8-naphthol-6-sulfonic acid in the first coupling and by substituting 1-naphthylamine-7-sulfonic acid for the 1-naphthylamine-6-sulfonic acid in the second coupling. The dye prepared in this way has the same properties and dyeing characteristics as the dye of Example I but it is of a slightly redder shade.

I claim:

1. A dyestuff having the following structure:

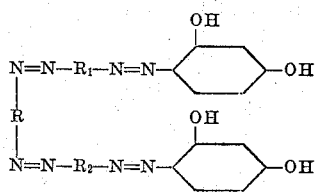

wherein R represents a diphenylamine-2-sulfonic acid radical having the azo linkages para to the secondary amino group; $R_1$ is a radical selected from the group consisting of

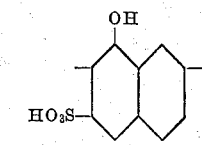

and

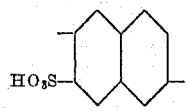

and $R_2$ is a radical selected from the group consisting of

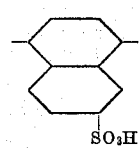

and

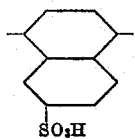

2. A dyestuff according to claim 1 wherein $R_1$ is

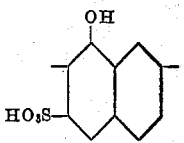

and $R_2$ is

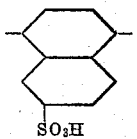

3. A dyestuff according to claim 1 wherein $R_1$ is

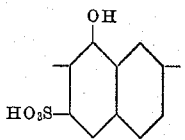

and $R_2$ is

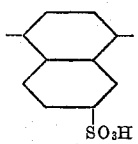

4. A dyestuff according to claim 1 wherein $R_1$ is

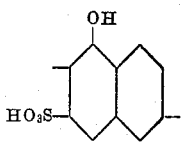

and $R_2$ is

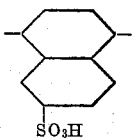

5. A dyestuff according to claim 1 wherein $R_1$ is

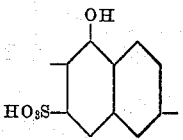

and $R_2$ is

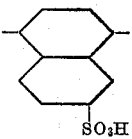

References Cited in the file of this patent

UNITED STATES PATENTS

| | | |
|---|---|---|
| 594,996 | Kahn et al. | Dec. 7, 1897 |
| 595,021 | Kahn et al. | Dec. 7, 1897 |
| 2,228,415 | Sparks et al. | Jan. 14, 1941 |

UNITED STATES PATENT OFFICE
CERTIFICATE OF CORRECTION

Patent No. 2,935,507            May 3, 1960

George F. Garcelon

It is hereby certified that error appears in the printed specification of the above numbered patent requiring correction and that the said Letters Patent should read as corrected below.

Column 1, lines 52 to 56, the formula should appear as shown below instead of as in the patent:

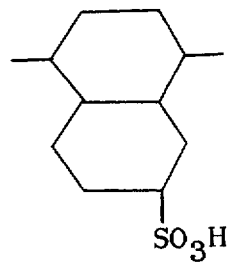

column 2, lines 24 to 31, the upper portion of (Structure IIb) should appear as shown below instead of as in the patent:

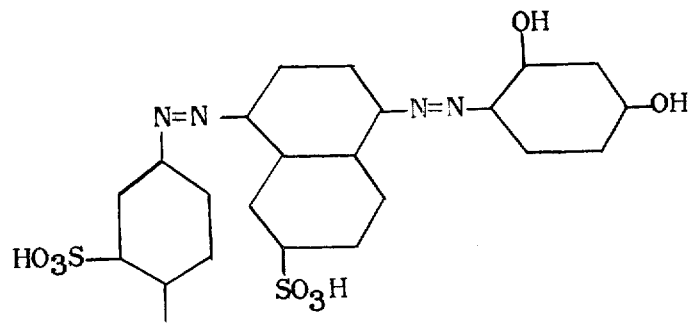

column 4, lines 34 to 39, and column 5, lines 45 to 49, the radical, in each occurrence, should appear as shown below instead of as in the patent:

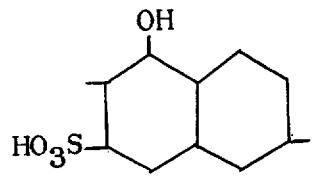

Signed and sealed this 31st day of January 1961.

(SEAL)
Attest:

KARL H. AXLINE            ROBERT C. WATSON
Attesting Officer           Commissioner of Patents